United States Patent
Tanaka

[11] 3,886,447
[45] May 27, 1975

[54] CAPACITANCE-VOLTAGE CONVERTER

[75] Inventor: Katsuaki Tanaka, Sagamihara, Japan

[73] Assignee: Iwasaki Tsushinki Kabushiki Kaisha, Japan

[22] Filed: May 16, 1973

[21] Appl. No.: 360,690

[30] Foreign Application Priority Data
May 17, 1972 Japan .............................. 47-48102
Dec. 27, 1972 Japan .............................. 48-3940
Dec. 27, 1972 Japan .............................. 48-3941
Dec. 27, 1972 Japan .............................. 48-3942

[52] U.S. Cl. ........................................... 324/60 CD
[51] Int. Cl. ................................. G01r 11/52
[58] Field of Search .................... 324/60 CD

[56] References Cited
UNITED STATES PATENTS

| | | | |
|---|---|---|---|
| 2,607,528 | 8/1952 | McWhirter et al. | 324/60 CD |
| 2,713,135 | 7/1955 | Macklem | 324/60 CD |
| 2,798,198 | 7/1957 | Dauphinee | 324/60 CD |
| 3,165,694 | 1/1965 | Young | 324/60 CD |
| 3,193,803 | 7/1965 | Hoffman | 324/60 CD |

OTHER PUBLICATIONS
Fundamentals of Electronics, AF Manual 101-8, July 1957, p. 73.
Basic Electrical Measurements, Melville B. Stout, Jan. 1955, pp. 159-161.
Operational Amplifiers, Barna, 1971, pp. 26 & 27.
Applications Manual for Operational Amplifiers, Philbrick/Nexus Research, a Teledyne Co., Aug. 1969, p. 19.

Primary Examiner—Stanley T. Krawczewicz
Attorney, Agent, or Firm—Robert E. Burns; Emmanuel J. Labato; Bruce L. Adams

[57] ABSTRACT

A capacitance-voltage converter, in which an unknown capacitance of a measured capacitor is converted to an output dc voltage indicative of the unknown capacitance. The measured capacitor is charged by a reference dc voltage. All the charge of the measured capacitor is transferred to a reference capacitor, after discharging the reference capacitor, by connecting the terminals of the measured capacitor to the input and the output of an impedance converter, which has a high-impedance input and a low-impedance output. The reference capacitor is connected to the high-impedance input of the impedance converter. The output dc voltage is derived from the output of the impedance converter.

3 Claims, 6 Drawing Figures

CAPACITANCE-VOLTAGE CONVERTER

This invention relates to capacitance meters and, more particularly, to capacitance-voltage converters.

A capacitance is heretofore measured by the use of a Wien bridge. However, the above measurement requires an unnegligible time for manually adjusting the apparatus to seek the equilibrium of the Wien bridge.

An object of this invention is to provide a capacitance-voltage converter having simple construction and capable of converting a capacitance to a dc voltage at a high speed and with high stability.

Another object of this invention is to provide a capacitance-voltage converter capable of simply converting a capacitance to a voltage in comparison with the conventional apparatus.

To attain the above objects of this invention, a capacitance-voltage converter is provided in which an unknown capacitance of a measured capacitor is converted to an output dc voltage representative of the unknown capacitance. The measured capacitor is charged by a reference dc voltage. All the charge of the measured capacitor is transferred to a reference capacitor after discharging the reference capacitor. In this case, the terminals of the measured capacitor are connected to the input and the output of an impedance converter, which has a high impedance input and a low-impedance output, and in which the reference capacitor is connected to the high impedance input thereof. The output dc voltage is derived from the output of the impedance converter.

The principle, construction and operations of this invention will be understood from the following detailed description taken in conjunction with the accompanying drawings, in which.

Figure 1:
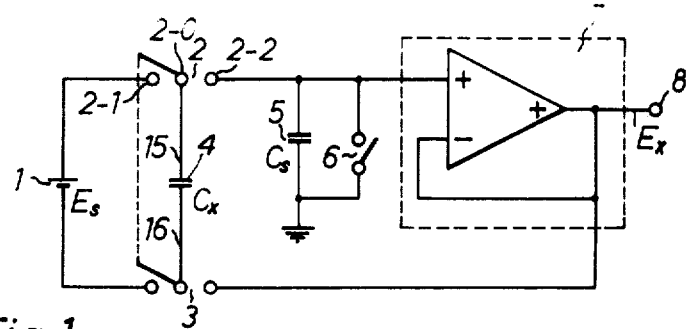
FIG. 1 is a circuit diagram illustrating an embodiment of this invention.

With reference to FIG. 1, an embodiment of this invention comprises a dc source 1 of a reference voltage Es, switches 2 and 3 gang-controlled to each other, a capacitor 4 of an unknown capacitance Cx, a capacitor 5 of a reference capacitance Cs, a switch 6, an impedance converter 7 and an output terminal 8. The switches 2 and 3 are gang-controlled to switch the terminals of the unknown capacitor 4 to the terminals of the reference dc source 1 or the input and output of the impedance converter 7. The impedance converter 7 has a low input impedance and a high output impedance and further has the same voltage at the input and the output thereof, as disclosed in Operational Amplifiers, McGraw-Hill 1971, pg. 430–431. The capacitor 5 is connected across the input of the impedance-converter 7 and ground for storaging all charges from the unknown capacitor 4. The switch 6 is employed for opening and closing the terminals of the capacitor 5.

In operation, the terminals of the unknown capacitor 4 are connected to the terminals of the reference dc source 1 by gang-control of the switches 2 and 3 after closing the switch 6, so that the reference voltage Es is applied to the unknown capacitor 4. In this case, an electric charge $Q_1$ storaged in the unknown capacitor 4 can be indicated as follows:

$$Q_1 = C_x \cdot E_s \tag{1}$$

Since the switch 6 is closed, the charge in the reference capacitor 5 is zero.

Next, the switches 2 and 3 are connected to the input and output of the impedance converter 7 after opening the switch 6. Since no voltage is applied across the input and output of the impedance converter 7 after obtaining a stationery condition, a sum $Q_2$ of charges in the capacitors 4 and 5 can be indicated as follows by the use of an output voltage $E_x$ at the output terminal 8:

$$Q_2 = C_s \cdot E_x \tag{2}$$

Since the charges $Q_1$ and $Q_2$ are equal to each other, the following relation can be obtained from the equations (1) and (2):

$$E_x = E_s/C_s \cdot C_x \tag{3}$$

Accordingly, the unknown capacitance $C_x$ of the capacitor 4 can be converted to the output voltage $E_x$. Since the values $E_s$ and $C_s$ are predetermined, the value $C_x$ of the unknown capacitor 4 can be obtained by measuring the output voltage $E_x$.

Figure 2:
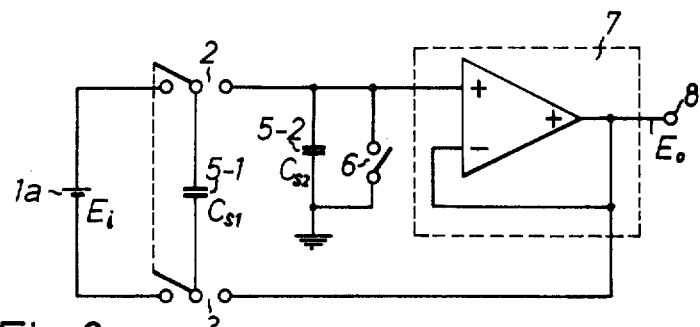
FIG. 2 is a circuit diagram explanatory of an actual application of this invention.

With reference to FIG. 2, an actual application of this invention will be described. In this example, an input signal 1a has a voltage $E_i$, while reference capacitors 5-1 and 5-2 have capacitances $C_{s1}$ and $C_{s2}$ respectively. Other constructions are the same as the embodiment shown in FIG. 1.

In operation, the terminals of the reference capacitor 5-1 are connected to the terminals of the input signal 1a to apply the input voltage $E_i$ to the reference capacitor 5-1 after closing the switch 6, so that the charge $Q_1$ of the reference capacitor $C_{s1}$ can be indicated as follows:

$$Q_1 = c_{s1} \cdot E_i \tag{4}$$

Since the switch 6 is closed, the charge in the reference capacitor 5-2 is zero. The switches 2 and 3 are connected to the input and output of the impedance converter 7 after opening the switch 6. A sum $Q_2$ of the charges in the reference capacitors 5-1 and 5-2 can be indicated as follows by the use of an output voltage $E_o$:

$$Q_2 = C_{s2} \cdot E_o \tag{5}$$

Since the charges $Q_1$ and $Q_2$ are equal to each other, the following relation can be obtained from the equations (4) and (5):

$$Eo = Cs1/Cs2 \; Ei \qquad (6)$$

Accordingly, the input voltage $Ei$ can be multiplied by a ratio $Cs1/Cs2$. The input voltage $Ei$ is amplified or attenuated in accordance with more or less than one of the ratio $Cs1/Cs2$ respectively.

In the embodiment shown in FIG. 1, the value $Cs$ of the reference capacitor 5 must be stepped up or down to maintain the output voltage $Ex$ in a certain range while the reference voltage $Es$ is constant. In a case where the reference voltage $Es$ is equal to two volts while the capacitance $Cx$ of the unknown capacitor 4 is distributed in a range of 0.1 pico-farads to 20,000 pico-farads, three capacitors of 200 pico-farads, 2,000 pico-farads and 20,000 pico-farads are necessary for the reference capacitor 5 to maintain the output voltage Ex in a range of 1 milli-volt to 2 volts. The increase of the number of reference capacitors results in the rise of price of the apparatus since such a reference capacitor having a negligible coefficient for instance temperature coefficient, has a high price.

Figure 3:
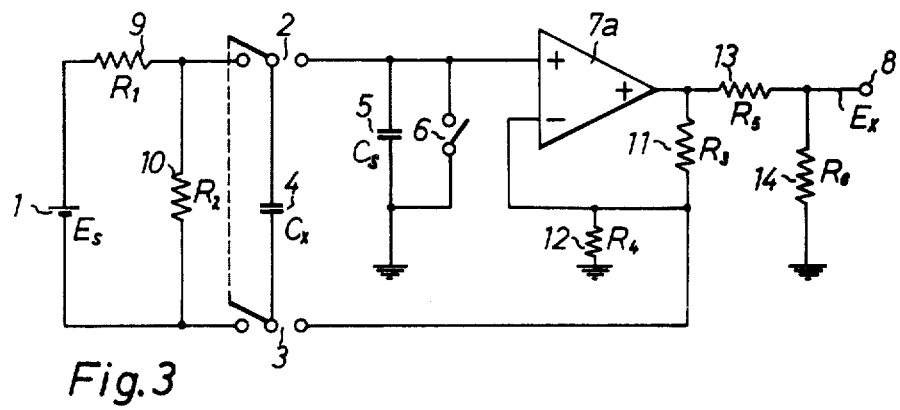
FIG. 3 is a circuit diagram illustrating another embodiment of this invention.

The above difficulty can be overcome by another embodiment shown in FIG. 3, in which resistors 9, 10, 11, 12, 13 and 14 are further employed in addition to elements in FIG. 1. The resistors 9 and 10 are employed to step down the reference voltage Es of the reference dc source 1. The resistor 11 is connected between the output and a first input of an operational amplifier 7a. The resistor 12 is connected across the first input of the operational amplifier 7a and ground. The resistors 13 and 14 forms an attenuator.

In operation, the terminals of the unknown capacitor 4 are connected to the terminals of the resistor 10 after closing the switch 6, so that a voltage $(R2/R1 + R2) Es$ is applied to the terminals of the unknown capacitor 4. In this case, a charge $Q_3$ storaged in the unknown capacitor 4 can be indicated as follows:

$$Q_3 = Cx \cdot R2/R1 + R2 \; Es \qquad (7)$$

Since the switch 6 is closed, the charge in the capacitor 5 is zero. The terminals of the unknown capacitor 4 are respectively connected to the two inputs of the operational amplifier 7a by gang-control of the switches 2 and 3. A sum $Q_4$ of charges in the capacitors 4 and 5 can be indicated as follows by the use of an output voltage Ex at the output terminal 8:

$$Q_4 = Cs \cdot R4/R6 \cdot R5 + R6/R3 + R4 \cdot Ex \qquad (8)$$

Since the charges $Q_3$ and $Q_4$ are equal to each other, the following relation can be obtained from the equations (7) and (8):

$$Ex = R2 \cdot R6/R4 \cdot R3 + R4/(R1 + R2)(R5 + R6) \cdot Es/Cs \cdot Cx \qquad (9)$$

If a value $K$ of $R2 \cdot R6/R4 \cdot R3 + R4/(R1 + R2)(R5 + R6) \cdot Es$ is stepped up or down, the output voltage Ex can be maintained at a certain range of voltage even if the value of the unknown capacitor 4 is distributed in a wide range of voltage. In a case where the value $Cx$ of the unknown capacitor 4 is distributed in a range of 0.1 pico-farad to 20,000 pico-farads under a value Cs of 4,000 pico-farads, the above defined value K may be set to values 40 volts, 4 volts, and 0.4 volts. To obtain the above defined value K of 40 volts, for example, the resistances R1 and R5 may be equal to zero while the resistance R3 may be equal to nine times the resistance R4 under the reference voltage Es of 4 volts.

To obtain the above defined value K of 4 volts, the resistances R1, R3 and R5 may be equal to zero under the reference voltage Es of 4 volts. Moreover, to obtain the value K of 0.4 volts under the reference voltage Es of 4 volts, the resistance R3 may be zero while values $R2/(R1 + R2)$ and $R6/(R5 + R6)$ may be values ¼ and 0.4 respectively. If the value $Cx$ of the known capacitor 4 is distributed in a rarrow range or if the output voltage Ex is not necessarily limited in a rarrow voltage range, the resistors 13 and 14 may form a fixed attenuator.

In the embodiment shown in FIG. 1, the connection lines 15 and 16 are liable to be affected by noise when they are connected to the high impedance input of the impedance converter 7. Moreover, a stray capacitance between the connection lines 15 and 16 is connected in parallel with the unknown capacitor 4, so that an error is caused by the stray capacitance if the length of the connection lines 15 and 16 changes.

Figure 4:
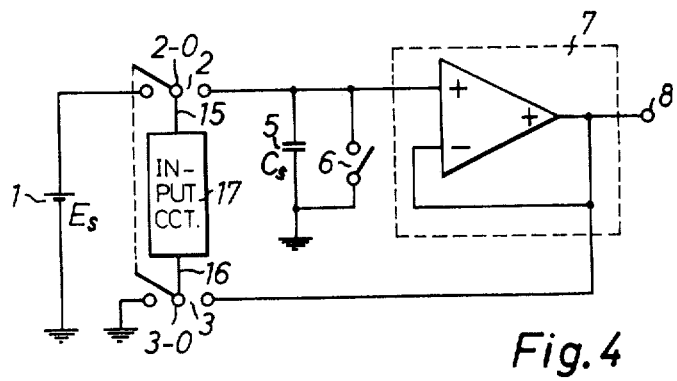
FIG. 4 is a circuit diagram illustrating another embodiment of this invention.
Figure 5:
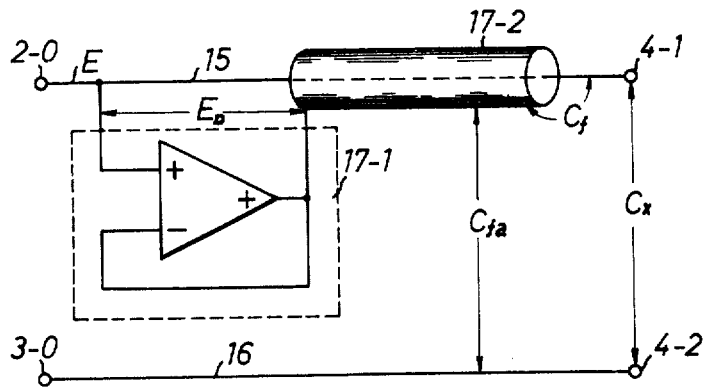
FIG. 5 is a circuit diagram illustrating an example of an input circuit employed in the embodiment shown in FIG. 4.

To eliminate the above deficiency, the terminals of the unknown capacitor 4 may be connected through an input circuit 17 to the contacts 2-0 and 3-0 of the switches 2 and 3 as shown in FIG. 4. An example of the input circuit 17 is illustrated in FIG. 5, in which a high-low impedance converter 17-1 and a shield wire 17-2 are employed. The input and the output of the impedance converter 17-1 are respectively connected to the inner conductor and the outer conductor of the shield wire 17-2. An unknown capacitor 4 of a capacitance $Cx$ is connected across terminals 4-1 and 4-2.

In FIG. 5, if it is assumed that the potential of the line 15 and the offset of the impedance converter 17-1 are voltages E and $E_D$ respectively, the potential of the outer conductor of the shield wire 17-2 can be indicated by a value $(E + E_D)$. Moreover, since the offset $E_D$ of the impedance converter 17-1 is applied across a capacitance Cf between the inner conductor and the outer conductor of the shield wire 17-2, if the offset $E_D$ is not fluctuated until the completion of one measurement cycle, the measurement of the unknown capacitance Cx can be performed without any effects from the capacitance Cf because of no charge or discharge of the capacitance Cf. Furthermore, since the outer conductor of the shield wire 17-2 is connected to the low-impedance output of the impedance converter 17-1, the inner conductor of the shield wire 17-2 is effectively shield against external noises by the low-impedance outer conductor of the shield wire 17-2. The conductor 16 can be protected against external noises by holding it at a low impedance. A capacitance Cfa between the conductor 16 and the outer conductor of the shield wire 17-2 does not affect the measurement of the unknown capacitance Cx since both of the conductors are connected to low-impedance outputs of the impedance converters 17-1 and 7.

In the embodiment shown in FIG. 1, a stray capacitance Ct between the common contact 2-0 of the switch 2 and ground including a stray capacitance of the conductor 15 against ground and a stray capacity of a contact 2-1 or 2-2 against ground causes an error on the measured value of the unknown capacitor Cx. The output voltage Ex can be indicated as follows in view of the stray capacitance Ct:

$$Ex = Es/Cs + Ct \cdot Cx + Es \cdot Ct/Cs + Ct \qquad (10)$$

The second term especially causes an error.

Figure 6:
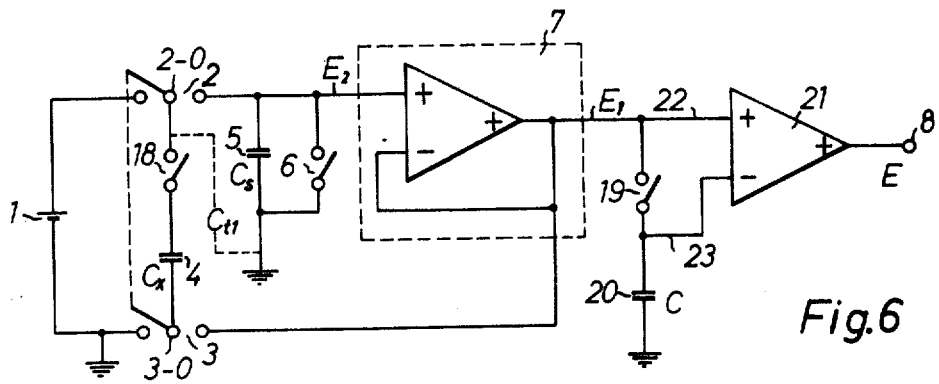
FIG. 6 is a circuit diagram illustrating another embodiment of this invention.

The above defects can be eliminated by another embodiment of this invention as shown in FIG. 6, in which switches 18 and 19, a differential amplifier 21 and a capacitor 20 are further provided in addition to circuit elements shown in FIG. 1.

In operation, the common terminals of the switches 2 and 3 are connected to the terminals of the reference dc source 1 by gang-control of the switches 2 and 3 after closing the switches 6 and 19 while the switch 18 is opened. In this case, if it is assumed that a stray capacitance against ground of a path from the common contact 2-0 to one terminal of the switch 18 is a value Ct1, a charge $Q_5$ storaged in the stray capacitance Ct1 can be indicated as follows:

$$Q_5 = Ct1 \cdot Es \qquad (11)$$

Next, the switches 2 and 3 are connected to the input and output of the impedance converter 7 after opening the switch 6 while switches 18 and 19 are remained as they are. If the input voltage of the impedance converter 7 is equal to the output voltage thereof, a voltage across the capacitor 5 is equal to a voltage across the capacitor 20.

If it is assumed that the output voltage of the impedance converter 7 is a value E1, a charge $Q_6$ storaged in the capacitor 5 and the storage capacitance Ct1 can be indicated as follows:

$$Q_6 = (Cs + Ct1) E1 \qquad (12)$$

Since the charges $Q_5$ and $Q_6$ are equal to each other, from the equations (11) and (12)

$$E1 = Es \cdot Ct1/Cs + Ct1 \qquad (13)$$

This voltage $E1$ is held in the capacitor 20.

Thereafter, the common terminals of the switches 2 and 3 are connected to the terminals of the reference dc source 1 after the switches 6 and 18 are closed while the switch 19 is opened. In this case, a charge $Q_7$ stored in the unknown capacitance Cx and the stray capacitance Ct1 can be indicated as follows;

$$Q_7 = (Cx + Ct1) Es \qquad (14)$$

Next, the common terminals of the switches 2 and 3 are connected to the input and the output of the impedance converter 7 after the switches 18 and 19 are remained as they are while the switch 6 is opened. In this case, if it is assumed that the a voltage across the capacitor 5, that is, the input voltage of the impedance converter 7 is a value E2, a charge $Q_8$ stored in the reference capacitor 5 and the stray capacitance Ct1 can be indicated as follows since no voltage is held in the unknown capacitance Cx because of the same voltage at the input and output of the impedance converter 7:

$$Q_8 = (Cs + Ct1) E2 \qquad (15)$$

Since the charges $Q_7$ and $Q_8$ are equal to each other, from the equations (14) and (15)

$$E2 = Es/Cs + Ct1 \cdot Cx + Es \cdot Ct1/Cs + Ct1 \qquad (16)$$

In this case, since the voltage E2 is applied to the input 22 of the differential amplifier 21 while the voltage E1 held in the capacitor 20 is applied to the other input 22 of the same differential amplifier 21, the output voltage of the output terminal 8 becomes a value K(E2 − E1) if the amplification factor of the differential amplifier 21 is assumed as a value K. Accordingly, the output voltage Ex of the output terminal 8 can be obtained from the equations (13) and (16) as follows:

$$Ex = K \cdot Es/Cs + Ct1 \cdot Cx \qquad (17)$$

In the embodiment shown in FIG. 6, the switches 2, 3, 6 and 19 may be semiconductor switches, but the switch 18 must be a switch having a small input capacitance and a small output capacitance, such as a reed relay.

If the reference capacitance Cs is sufficiently larger than the stray capacitance Ct1, an effective error caused by the stray capacitance Ct1 is substantially negligible.

What I claim is:

1. A capacitance-voltage converter, comprising:
   a reference voltage source for producing a reference dc voltage and having one terminal connected to ground;
   a first impedance converter having a high input impedance and a low output impedance and assuming the same voltage at the input and the output thereof;
   a second impedance converter;
   a shield wire having an inner conductor and an outer conductor shielding the inner conductor, the inner conductor having one end connected to one terminal of a measured capacitor of an unknown capacitance and having the other end connected to the input of the second impedance converter, the outer conductor being connected to the output of the second impedance converter;
   a connection line having one end connected to the other terminal of the measured capacitor;
   a first switch for selectively connecting the other end of the connection line to ground or the output of the first impedance converter;
   a second switch gang-controlled with the first switch for selectively connecting the input of the second impedance converter to the other terminal of the reference voltage source or the input of the first impedance converter;
   a reference capacitor connected across ground and the input of the first impedance converter;
   a third switch connected in parallel with the reference capacitor for opening or closing the terminals of the reference capacitor; and output terminal means connected to the output of the first impedance converter for obtaining an output voltage corresponding to the unknown capacitance.

2. A capacitance-voltage converter according to claim 1 further comprising:
- a fourth switch and a voltage-hold capacitor connected in series with the voltage-hold capacitor grounded and the switch connected to the output of the first impedance converter; and
- a differential amplifier having one input connected to the output of the first impedance converter and the other input connected to a junction between the voltage-hold capacitor and the fourth switch.

3. A capacitance-voltage converter, comprising:
- a reference voltage source for producing a reference dc voltage;
- an impedance converter having a high input impedance and a low output impedance and developing a voltage at the output equal to the voltage at the input thereof;
- a first switch connected in series to a capacitor of unknown capacitance to be determined to form a series-connection of the first switch and the measured capacitor;
- gang-switches for selectively connecting the terminals of said series-connection to the terminals of the reference voltage source or the input and the output of the impedance converter;
- a reference capacitor connected across ground and the input of said impedance converter;
- a second switch connected in parallel with the terminals of the reference capacitor for opening or closing the terminals of the reference capacitor;
- a second series-connection of a third switch and a voltage-hold capacitor connected across ground and the output of the impedance converter so that the voltage-hold capacitor is connected to the ground;
- a differential amplifier having one input connected to the output of the impedance converter and the other input connected to a junction between the voltage-hold capacitor and the third switch; and
- output terminal means connected to the output of the differential amplifier for providing an output voltage corresponding to the unknown capacitance.

* * * * *